Patented Mar. 7, 1939

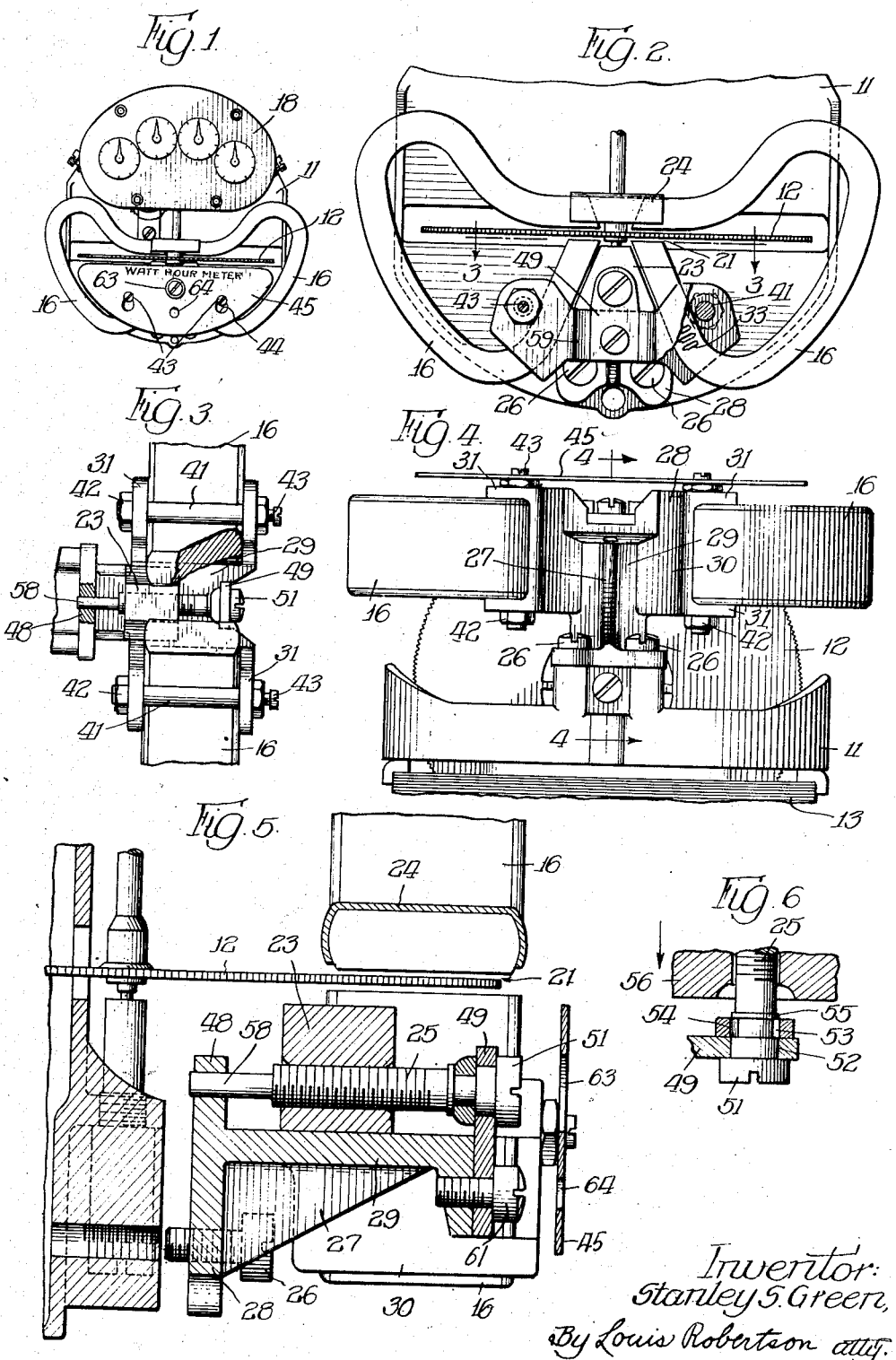

2,149,287

UNITED STATES PATENT OFFICE 2,149,287

ELECTRIC METER

Stanley S. Green, La Fayette, Ind., assignor to Duncan Electric Mfg. Co., La Fayette, Ind., a corporation of Illinois Application August 24, 1935, Serial No. 37,669

20 Claims. (Cl. 171—34)

This invention relates to electric watt-hour meters and more particularly to such meters including a novel form of damping magnet assembly.

Watt-hour meters include a rotatable disc, an electro-magnetic driving element designed to drive the disc with a torque proportional to the measured power consumption, and permanent damping magnets which so oppose the rotation of the disc, by causing magnetic flux to pass through it, that the speed of the disc is proportional to the driving torque, and therefore to the measured power consumption.

It is common to provide two such permanent magnets so arranged as to make their maximum damping effect available, and then to adjust the meter by shifting a magnetic shunt to divert a variable amount of the flux from the disc. It has long been the practice to so mount the magnets and their adjusting shunt that they can be removed as a unitary assembly without disturbing the adjustment, so that when the magnets are replaced readjustment will not be necessary.

It is an object of the present invention to provide a watt-hour meter having an improved removable damping magnet assembly, and particularly to provide such an assembly which is thoroughly dependable and at the same time economical to manufacture.

It is a further object of the invention to provide such an assembly in which the adjustment means is entirely free from lost motion or back lash, so that it may be varied accurately by minute turns of the adjusting member which is preferably a screw accessible to a screw driver from the front of the meter. It is, of course, very desirable to be able to adjust the meter from the front, simply by removing the cover, and a rearwardly-extending screw lends itself particularly well to compactness.

Another object is to provide a structure in which the magnets are secured with absolutely dependable immovability with respect to the securing bracket. It is preferred that this be accomplished by a press operation causing the metal of the bracket to flow into intimate contact with the magnets, and then providing screws or bolts to prevent loosening the bracket due to residual resilience.

Other objects will be evident from the following description and from the drawing in which:

Fig. 1 is a front elevation of the meter chosen for illustration of this invention, the case not being shown.

Fig. 2 is a fragmentary view on a larger scale of the structure of Fig. 1 with the name plate removed.

Fig. 3 is a fragmentary view taken along the line 3—3 of Fig. 2, looking downward toward the lower poles, the adjustable shunt and the bracket.

Fig. 4 is a bottom view of the structure shown in Fig. 1.

Fig. 5 is a vertical section taken substantially along the line 4—4 of Fig. 4, but showing the damping magnet assembly being removed from the meter frame.

Fig. 6 is a diagrammatic sectional view of the formation of the adjustment screw journal.

Although this invention may take numerous forms, only one has been chosen for illustration. In this form the meter includes a meter frame 11 on which is rotatably mounted a disc 12 which is driven in the usual way by an electro-magnet indicated by the core laminations 13 in Fig. 4. The speed of the disc is retarded by the damping magnet 16 so as to be proportional to the power consumption measured. A register 18 is driven by the meter disc 12 to indicate the amount of the power consumption measured. One important feature of the invention discussed below is concerned primarily with the mounting of the damping magnets 16 and the parts associated therewith.

According to the usual practice, each of the damping magnets 16 is shaped with a narrow gap 21 between its poles, the two gaps of the two damping magnets being aligned and the meter disc being positioned therein and rotating therethrough. The damping torque produced by the magnets depends on the magnetic flux which passes through the disc 12 in these gaps 21. The meter can therefore be adjusted by varying the intensity of the flux passing through the disc. It is customary to do this by providing an adjustable shunt between adjacent poles on one side of the disc to divert as much of the flux as may be desired away from the disc. According to an important feature of the present invention which is discussed more fully below, this adjusting shunt takes the form of the wedge-shaped bar of metal 23 which may be adjusted by a screw 25 between a position of maximum shunting and a position of minimum shunting.

It is also common practice to provide a clip such as the clip 24 shunting the adjacent pole pieces on the opposite side of the disc, this clip being of a metal which compensates the meter for variations of temperature. Since this clip operates upon known principles, the novel features of this invention are not particularly concerned with it, and it may therefore be ignored hereafter.

Although assemblies of magnets and adjustable shunts removable as a unit from the meter have long been known, the mounting of such assemblies, including the securing of its parts to one another and as a unit to the meter frame, has not been entirely satisfactory, and one of the features of the present invention therefore is an improved mounting for the assembly.

According to the present invention, the magnets and shunt are properly positioned and supported by a bracket 28 which is preferably a sturdy, rigid member cast from a suitable metal, such as brass. This bracket is removably secured to the frame 11, as by the two screws 26, as illustrated, which pass through a vertically disposed portion of the bracket and are accessible from the front of the meter when the name plate 31 is removed. In other words, simply by unscrewing the two screws 26 the entire damping magnet assembly may be removed and, as will be seen later, it may be removed and replaced without affecting the adjustment of the meter. The bracket 28 includes a horizontal table-like member 29 braced by a web 27. Slanting downwardly from table 29 are magnet-supporting extensions 30.

The extensions 30 each includes a pair of arms 31 which are initially spaced apart far enough for the magnet 16 to be inserted between said arms and against said extensions 30. While the magnet is temporarily held properly positioned, a press squeezes the arms 31 against the magnet with such force that the metal of the arms is caused to flow around the magnet. The edges of the magnet are preferably provided with a plurality of notches 33 into which the metal of the bracket flows, thus anchoring the magnets in place.

During this press operation the parts may be held together by a suitable jig, a substantially T-shaped spacing member being used to position the parts. The horizontal members of the T may pass through the slots 21 holding them perfectly aligned, and the leg of the T may be substantially the same as the wedge 23, only slightly larger. The clamping members of the jig may then press the lower pole pieces of the magnet firmly against this T-shaped spacing member.

Although the press operation described would often be enough to hold the magnets sufficiently firm, there is sometimes enough residual resiliency in the bracket member so that, when the pressure is released, the arms do not engage the magnets quite as firmly as desired. It should be recognized that absolute immovability of the magnets is essential to the accuracy of the meter—so essential, in fact, that a certainty rather than a mere probability of such immovability is desired. To this end a bolt 41 is passed through suitable holes in the arms 31 and screwed into a nut 42. When these nuts and bolts are tightened, the immovability of the magnet 16 becomes an absolute certainty.

The use of these bolts has another advantage in that their heads may be drilled and tapped so that small screws 43 may be inserted into them. This furnishes a very convenient means for supporting the name plate 45 which may be provided with keyhole slots 44 so that only a slight loosening of the screws 43 is necessary to remove the name plates.

The meter adjusting shunt 23 is substantially wedge-shaped in cross section, as illustrated in Fig. 2, and is positioned to slide along the table 29 so that, if moved to the right in Figs. 3 and 5, it will lie entirely between the lower pole pieces of the magnet while, if moved to the left, as seen in Figs. 3 and 5, it will be almost entirely out from between said pole pieces. The movement of this shunt is accomplished by means of the adjustment screw 25 which at its rear or inner end is journalled in an upstanding arm or lug 48 formed on the bracket 28 and at its front end is journalled to the bracket by means of a journal plate 49.

Before assembly of the meter, the adjusting screw 25 is journalled in a loose journal plate 49 in the manner illustrated in Fig. 6. The screw 25 has an enlarged head 51 and a bearing portion 52 which is slightly larger than the threaded portion of the screw. The journal plate 49 has a hole formed therein which fits snugly around the bearing portion 52 and this plate is passed over the threaded portion of the screw to the position shown. Adjacent to the bearing portion 52 is an annular recess 53. A washer 54 formed of a suitable metal, such as brass, is then slipped over the threaded portion of the screw and over the annular shoulder 55 to the position shown in Fig. 6. The shoulder 55 should not be larger than the bearing portion 52. These parts thus assembled are placed in a press, and a die 56 is brought down on the washer as diagrammatically shown in Fig. 6 with such force as to cause the metal of the washer to flow into the annular recess 53 so that it fits tightly against the shoulder 55 and against the journal plate 49, approximately as shown in Fig. 5. This provides a journalling for the screw 25 which is absolutely free from play and which, furthermore, is so tight that the screw 25 cannot be turned except by the application of considerable force thereto, thus assuring that, once the meter has been adjusted, it will stay adjusted. Of course, the screw can be turned with a screw driver without undue difficulty when desired.

When the screw 25 has been journalled into the loose journal plate 49, as just described, the shunt 23 may be screwed onto it, after which the spindle 58 formed at the inner end of the screw may be inserted into the hole formed in the lug portion 48, as illustrated in Fig. 5, the journal plate 49 being slipped in between the two shoulders 59 formed on the bracket 28 at the same time. The shunt, or especially that portion of it lying below the screw, is preferably of such dimensions that it will initially hold the screw higher than the position shown in Fig. 5, so that the outer end of the screw 25 will have to be sprung down for the securing screw 61 to be inserted through the hole provided in the journal plate 49 and into the tapped hole provided in the bracket 28. The adjustment screw 25 is thus placed in a state of elastic distortion pressing the shunt 23 against the table 29 and in so doing pressing the threads of the screw 25 and of wedge 23 into a firm engagement free from play or back lash.

Both of these play-eliminating features are very important; namely, the journalling of the screw in the journal plate 49, and the distortion of the screw to eliminate back lash in its threaded engagement with the shunt. The combination of these two features is even more important, since it positively assures that vibration or slipping of the meter or handling the assembly in removing it will not alter the position of the shunt 23. Furthermore, in adjusting the meter a very slight turn of the adjusting screw 25 in either direction will move the shunt 23 the amount that would be expected. Thus, if the meter adjuster makes a very slight turn in one direction and finds that this turn was a trifle too much, he can make an even smaller turn in the opposite direction without any fear that this small turn will be consumed in taking up back lash.

Another important feature of the adjustable shunt arrangement illustrated is that since the screw extends rearwardly the adjustment may be made by a screwing movement of a screw driver from the front of the meter. Since the meter is always sealed in a housing except when it is being adjusted or inspected, there would be no advantage in requiring a special tool for adjustment. On the other hand, an adjusting wheel which could be manipulated by hand or by a planetary movement of the screw driver is less desirable than the present arrangement, since such wheels must necessarily take up valuable space. With the present arrangement, the space in the face of the meter required by the adjustment member, namely, the screw head 51, is so small that it may be made fully accessible for the purpose of adjustment merely by the provision of a hole 63 in the name plate 45. It may also be mentioned that another hole 64 may be provided in the name plate 45, through which the screw 61 may be inspected.

It should also be noted that these features relating to the adjustment are especially valuable in connection with the particular form of mounting of the magnets here disclosed, since the proximity of the shunt to the magnets is one factor which makes the exact and dependable positioning of the magnets extremely important, and since the use of a single bracket to which both the magnets and the shunt are secured and which, in turn, are secured to the frame of the meter, is both dependable and economical, and insures continued accuracy of the meter after the damping magnet assembly has been temporarily removed and then replaced.

To remove the damping magnet assembly it is merely necessary to unscrew the two screws 26, after which the whole assembly may be removed as a unit, as shown in Fig. 5. This removal does not affect the position of the damping magnets 16 with respect to one another nor does it affect the adjustment of the shunt 23.

Although but one embodiment of my invention has been herein shown and described, it is to be understood that the invention is not limited thereby, but is to be limited only by the prior art. The following claims are intended to point out some of the features now recognized as new, rather than to limit the invention to these features.

I claim:

1. A watt-hour meter including a meter disc, a support member, and a damping magnet assembly removably secured as a unit to said support member in a position to cause its flux to pass through said disc; said damping magnet assembly including a bracket secured to said support member by screws accessible from the front of the meter, a pair of permanent magnets secured to said bracket by pairs of arms on the bracket intimately gripping said magnets and secured against release by screw means extending through each of said pairs of arms and drawing them tightly onto said magnets.

2. A watt-hour meter including a meter disc, a support member, and a damping magnet assembly removably secured as a unit to said support member in a position to cause its flux to pass through said disc; said damping magnet assembly including a bracket secured to said support member by screws accessible from the front of the meter, a pair of permanent magnets secured to said bracket by pairs of arms on the bracket intimately gripping said magnets and secured against release by screw means, and said magnets having notches formed therein with which the metal of said clamp interlocks, the inner end of said screw means screwing into a nut and the other end carrying a small screw threaded into it and a name plate mounted on said small screw.

3. A watt-hour meter including damping magnet means having a pair of closely spaced opposed poles, a bracket having a slide surface and end projections extending therebeyond secured to said magnet means, a magnetic shunt slidable on the slide surface of said bracket between said poles and an adjusting screw screwed through said shunt to shift the shunt by a screwing engagement therewith and journalled at both ends to said bracket.

4. A watt-hour meter including damping magnet means having a pair of closely spaced opposed poles, a bracket having a slide surface and end projections extending therebeyond secured to said magnet means, a magnetic shunt slidable on the slide surface of said bracket between said poles and an adjusting screw screwed through said shunt and journalled at both ends to said bracket, said screw being in a state of elastic distortion pressing said shunt against said bracket and the threads of said screw against the threads of said shunt.

5. A watt-hour meter including damping magnet means having a pair of closely spaced opposed poles, a bracket having a slide surface and end projections extending therebeyond secured to said magnet means, a magnetic shunt slidable on the slide surface of said bracket between said poles and an adjusting screw screwed through said shunt and journalled at both ends to said bracket, the journal at one end of the screw comprising a separable plate which fits into a recess in the bracket.

6. A watt-hour meter including damping magnet means having a pair of closely spaced opposed poles, a bracket having a slide surface and end projections extending therebeyond secured to said magnet means, a magnetic shunt slidable on the slide surface of said bracket between said poles and an adjusting screw screwed through said shunt and journalled at both ends to said bracket, said screw being in a state of elastic distortion pressing said shunt against said bracket and the threads of said screw against the threads of said shunt, the journal at one end of the screw comprising a separable plate which fits into a recess in the bracket and is slidable therein in a direction to cause the said distortion of said screw and which is normally restrained from any relative movement with respect to the bracket.

7. A watt-hour meter including damping magnet means having a pair of closely spaced opposed poles, a bracket secured to said magnet means, a magnetic shunt shiftable between said poles, and an adjusting screw journalled to one of the pair of members comprising said bracket and said shunt with a journal free from perceptible play and having a resilient threaded engagement with the other of said pair of members, which is free of perceptible play.

8. A watt-hour meter including damping magnet means having a pair of closely spaced opposed poles, a bracket having a slide surface and end projections extending therebeyond secured to said magnet means, a magnetic shunt slidable on the slide surface of said bracket between said poles and an adjusting screw screwed through said shunt and journaled at both ends to said bracket, the journal at one end of the screw comprising a separable plate which fits into a recess in the bracket, and a washer having a tight fit between said plate and a shoulder on said screw.

9. A watt-hour meter including damping magnet means having a pair of closely spaced opposed poles, a bracket secured to said magnet means, a magnetic shunt shiftable between said poles, and an adjusting screw journalled to said bracket and screwed into said shunt for shifting it more or less between the poles, the engagement between said adjustment screw and said shunt being free from play, and the journalling of said screw comprising an arm on said bracket bearing against an an annular shoulder on said screw and a washer annularly contracted between said arm and another annular shoulder on said screw and pressing tightly against them to at least minimize the play between them.

10. A removable damping magnet assembly for watt-hour meters including a bracket having a slide surface, a pair of damping magnets secured thereto, a pair of arms upstanding from said bracket member on a line between said magnets, an adjusting screw journalled in said arms and a magnetic shunt slidable on the slide surface of said bracket between and out from between said magnets, having a threaded engagement with said adjusting screw, and being of such dimensions as to co-act with said arms to distort said screw.

11. A watt-hour meter including damping magnet means having a pair of closely spaced opposed poles, a magnetic shunt in a path of flux between said poles, shiftable to vary its shunting effect, an adjusting screw for shifting said shunt, and means for eliminating backlash in the movement of said shunt by said screw, and for applying resilient resistance to the turning of said screw, said screw and said shunt being substantially unbiased toward any adjusting movement.

12. A watt-hour meter including damping magnet means having a pair of closely spaced opposed poles, a bracket secured to said magnet means, a magnetic shunt forming a path extending between said poles and shiftable to vary its shunting effect; screw adjusting means for shifting said shunt including a screw having threads engaging threads for moving said shunt, and means holding said screw in a state of elastic distortion laterally to press said threads together to avoid play.

13. A watt-hour meter including damping magnet means having a pair of closely spaced opposed poles, a bracket secured to said magnet means, a magnetic shunt forming a path extending between said poles and shiftable to vary its shunting effect, an adjusting screw journaled to said bracket for shifting said shunt, the connection between said adjustment screw and said shunt being substantially free from play, and the journalling of said screw comprising an arm on said bracket bearing against an annular shoulder on said screw and a washer annularly contracted between said arm and another annular shoulder on said screw and pressing tightly against them to at least minimize the play between them.

14. A damping magnet assembly including a bracket and a damping magnet secured to said bracket by a pair of arms on the bracket intimately gripping said magnet and secured against release by screw means extending between and into said arms with the magnet disposed between said screw means and the main part of the bracket.

15. A watt-hour meter including a base adapted to be mounted on a wall and a meter mechanism carried by said base including a rotatable disc, damping magnet means having a pair of closely spaced opposed pole portions adjacent one face of said disc, a magnetic shunt positioned in a path of flux extending between said pole portions and shiftable forwardly and rearwardly to have more or less of its body in an effective shunting position substantially bridging said pole portions, and screw means for moving said shunt, said screw means being provided with a forwardly open slot and being operable from the front of the meter by rotation about a forwardly extending axis.

16. A watt-hour meter including a base adapted to be mounted on a wall and a meter mechanism carried by said base including a frame, a disc rotatably carried thereby and damping magnet means supported by said frame at an invariable radial position with respect to said disc and having a pair of closely spaced opposed pole portions adjacent one face of said disc, a magnetic shunt positioned in a path of flux extending between said pole portions and shiftable forwardly and rearwardly to have more or less of its body in an effective shunting position substantially bridging said pole portions, and screw means for moving said shunt, said screw means being provided with a forwardly open slot and being operable from the front of the meter by rotation about a forwardly extending axis, said magnetic shunt having such cross-section and in its extreme shunting position being positioned so close to both poles over an extended area thereof as to shunt enough magnetic flux to provide adequate full load meter adjustment while maintaining the magnet means in a fixed position.

17. A watt-hour meter including damping magnet means having a pair of legs terminating in closely spaced opposed poles, a bracket secured to said magnet means, a magnetic shunt shiftable between said legs and having a flat side adjacent each of said pair, and means for moving said shunt in a direction transverse with respect to the legs for substantially removing it from between the legs.

18. A watt-hour meter including damping magnet means having a pair of legs terminating in closely spaced opposed poles, a bracket secured to said magnet means, a magnetic shunt shiftable between said legs and having a flat side surface at times closely adjacent a parallel flat surface on each of said pair, and means for moving the shunt to adjust the damping magnet means.

19. A watt-hour meter including a damping magnet assembly having magnet pole portions forming a pair of closely spaced opposed poles, a bracket having a body portion adapted for mounting on the meter, a pair of arms integral with the body portion rigidly gripping the magnet means, and an end wall integral with the body portion, generally alined with the space between the pole portions and having a threaded hole therein, a screw fitted snugly in said hole, provided with a forwardly open slot and rotatable about a forwardly extending axis, means separately secured to said bracket, applying resistance to the rotation of said screw, and accurately positioning a portion thereof remote from the hole; said assembly including magnetic shunt means shiftable forwardly and rearwardly by rotation of the screw to have more or less of its body directly between the pole portions.

20. A watt-hour meter including a base adapted to be mounted on a wall, and a meter mechanism carried by said base including a rotatable disc, damping magnet means having a pair of closely spaced opposed pole portions adjacent one face of said disc, a magnetic shunt positioned in a path of flux of said magnet means and shiftable forwardly and rearwardly to have more or less of its body in an effective shunting position in said path substantially bridging portions thereof adjacent the shunt, and screw means for moving said shunt, said screw means being provided with a forwardly open slot and being operable from the front of the meter by rotation about a forwardly extending axis, and said magnetic shunt having a flat surface adjacent to a substantially parallel flat surface of each of the magnet portions adjacent the shunt.

STANLEY S. GREEN.